(12) United States Patent
Hsien

(10) Patent No.: US 6,742,067 B2
(45) Date of Patent: May 25, 2004

(54) PERSONAL COMPUTER MAIN BOARD FOR MOUNTING THEREIN MEMORY MODULE

(75) Inventor: Kuo Chih Hsien, Hsinchu (TW)

(73) Assignee: Silicon Integrated System Corp., Hsinchu (TW)

( * ) Notice: Subject to any disclaimer, the term of this patent is extended or adjusted under 35 U.S.C. 154(b) by 501 days.

(21) Appl. No.: 09/839,781

(22) Filed: Apr. 20, 2001

(65) Prior Publication Data

US 2002/0156959 A1 Oct. 24, 2002

(51) Int. Cl.[7] .................................................. G06F 1/26
(52) U.S. Cl. ....................................... 710/301; 713/300
(58) Field of Search ........................ 710/301; 713/300; 711/105, 115; 365/222, 226, 189.09

(56) References Cited

U.S. PATENT DOCUMENTS

| | | | |
|---|---|---|---|
| 5,532,945 A | * | 7/1996 | Robinson ..................... 713/321 |
| 5,615,328 A | * | 3/1997 | Hadderman et al. .......... 714/22 |
| 5,680,625 A | * | 10/1997 | Sekine et al. ................ 713/330 |
| 6,218,817 B1 | * | 4/2001 | Chang ........................ 323/283 |

FOREIGN PATENT DOCUMENTS

JP         02000010668 A   *  1/2000   ............. G06F/1/26

* cited by examiner

Primary Examiner—Xuan M. Thai
(74) Attorney, Agent, or Firm—Volpe and Koenig, P.C.

(57) ABSTRACT

A personal computer (PC) main board is used for mounting therein a memory module, and the memory module is capable of mounting therein one selected from a first type of Dynamic Random Access Memory (DRAM) and a second type of DRAM. The PC main board includes a memory module slot for replacably inserting therein the memory module and providing an operation voltage thereto, a switch device electrically connected to the memory module slot for changing a switching mode to adjust the operation voltage and an electric interface mode of the memory module in response to the type of the memory module, and a chipset electrically connected to the memory module slot and the switch device for switching operation modes between the first type of DRAM and the second type of DRAM in response to the switching mode of the switch device.

11 Claims, 9 Drawing Sheets

| Pin | Symbol | Pin | Symbol | Pin | Symbol | Pin | Symbol |
|---|---|---|---|---|---|---|---|
| 1 | V$_{REF}$ | 47 | NC | 93 | V$_{SS}$ | 139 | V$_{SS}$ |
| 2 | DQ0 | 48 | A0 | 94 | DQ4 | 140 | NC |
| 3 | NC | 49 | NC | 95 | DQ5 | 141 | A10 |
| 4 | DQ1 | 50 | V$_{SS}$ | 96 | V$_{DD}$Q | 142 | NC |
| 5 | DQS0 | 51 | NC | 97 | DQS9 | 143 | V$_{DD}$Q |
| 6 | DQ2 | 52 | BA1 | 98 | DQ6 | 144 | NC |
| 7 | V$_{DD}$ | 53 | DQ32 | 99 | DQ7 | 145 | V$_{SS}$ |
| 8 | DQ3 | 54 | V$_{DD}$Q | 100 | V$_{SS}$ | 146 | DQ36 |
| 9 | NC | 55 | DQ33 | 101 | NC | 147 | DQ37 |
| 10 | NC | 56 | DQS4 | 102 | NC | 148 | V$_{DD}$ |
| 11 | V$_{SS}$ | 57 | DQ34 | 103 | NC(A13) | 149 | DQS13 |
| 12 | DQ8 | 58 | V$_{SS}$ | 104 | V$_{DD}$Q | 150 | DQ38 |
| 13 | DQ9 | 59 | BA0 | 105 | DQ12 | 151 | DQ39 |
| 14 | DQS1 | 60 | DQ35 | 106 | DQ13 | 152 | V$_{SS}$ |
| 15 | V$_{DD}$Q | 61 | DQ40 | 107 | DQS10 | 153 | DQ44 |
| 16 | CK1 | 62 | V$_{DD}$Q | 108 | V$_{DD}$ | 154 | RAS# |
| 17 | CK1# | 63 | WE# | 109 | DQ14 | 155 | DQ45 |
| 18 | V$_{SS}$ | 64 | DQ41 | 110 | DQ15 | 156 | V$_{DD}$Q |
| 19 | DQ10 | 65 | CAS# | 111 | CKE1 | 157 | S0# |
| 20 | DQ11 | 66 | V$_{SS}$ | 112 | V$_{DD}$Q | 158 | S1# |
| 21 | CKE0 | 67 | DQS5 | 113 | NC(BA2) | 159 | DQS14 |
| 22 | V$_{DD}$Q | 68 | DQ42 | 114 | DQ21 | 160 | V$_{SS}$ |
| 23 | DQ16 | 69 | DQ43 | 115 | NC(A12) | 161 | DQ46 |
| 24 | DQ17 | 70 | V$_{DD}$ | 116 | V$_{SS}$ | 162 | DQ47 |
| 25 | DQS2 | 71 | NC(S2#) | 117 | DQ21 | 163 | NC(S3#) |
| 26 | V$_{SS}$ | 72 | DQ48 | 118 | A11 | 164 | V$_{DD}$Q |
| 27 | A9 | 73 | DQ49 | 119 | DQS11 | 165 | DQ52 |
| 28 | DQ18 | 74 | V$_{SS}$ | 120 | V$_{DD}$ | 166 | DQ53 |
| 29 | A7 | 75 | CK2# | 121 | DQ22 | 167 | NC(FETEN) |
| 30 | V$_{DD}$Q | 76 | CK2 | 122 | A8 | 168 | V$_{DD}$ |
| 31 | DQ19 | 77 | V$_{DD}$Q | 123 | DQ23 | 169 | DQS15 |
| 32 | A5 | 78 | DQS6 | 124 | V$_{SS}$ | 170 | DQ54 |
| 33 | DQ24 | 79 | DQ50 | 125 | A6 | 171 | DQ55 |
| 34 | V$_{SS}$ | 80 | DQ51 | 126 | DQ28 | 172 | V$_{DD}$Q |
| 35 | DQ25 | 81 | V$_{SS}$ | 127 | DQ29 | 173 | NC |
| 36 | DQS3 | 82 | V$_{DDID}$ | 128 | V$_{DD}$Q | 174 | DQ60 |
| 37 | DQ56 | 83 | DQ56 | 129 | DQS12 | 175 | DQ61 |
| 38 | V$_{DD}$ | 84 | DQ57 | 130 | A3 | 176 | V$_{SS}$ |
| 39 | DQ26 | 85 | V$_{DD}$ | 131 | DQ30 | 177 | DQS16 |
| 40 | DQ27 | 86 | DQ57 | 132 | V$_{SS}$ | 178 | DQ62 |
| 41 | A2 | 87 | DQ58 | 133 | DQ31 | 179 | DQ63 |
| 42 | V$_{SS}$ | 88 | DQ59 | 134 | NC | 180 | V$_{DD}$Q |
| 43 | A1 | 89 | V$_{SS}$ | 135 | NC | 181 | SA0 |
| 44 | NC | 90 | WP | 136 | V$_{DD}$Q | 182 | SA1 |
| 45 | NC | 91 | SDA | 137 | CK0 | 183 | SA2 |
| 46 | V$_{DD}$ | 92 | SCL | 138 | CK0# | 184 | V$_{DDSPD}$ |

Fig. 2

| Pin | Symbol | Pin | Symbol | Pin | Symbol | Pin | Symbol |
|---|---|---|---|---|---|---|---|
| 1 | NC | 47 | NC | 93 | Vss | 139 | Vss |
| 2 | DQ0 | 48 | A0 | 94 | DQ4 | 140 | NC |
| 3 | NC | 49 | NC | 95 | DQ5 | 141 | A10 |
| 4 | DQ1 | 50 | Vss | 96 | $V_{DD}Q$ | 142 | NC |
| 5 | NC | 51 | NC | 97 | DQM0 | 143 | $V_{DD}Q$ |
| 6 | DQ2 | 52 | BA1 | 98 | DQ6 | 144 | NC |
| 7 | $V_{DD}$ | 53 | DQ32 | 99 | DQ7 | 145 | Vss |
| 8 | DQ3 | 54 | $V_{DD}Q$ | 100 | Vss | 146 | DQ36 |
| 9 | NC | 55 | DQ33 | 101 | NC | 147 | DQ37 |
| 10 | NC | 56 | NC | 102 | NC | 148 | $V_{DD}$ |
| 11 | Vss | 57 | DQ34 | 103 | NC(A13) | 149 | DQM4 |
| 12 | DQ8 | 58 | Vss | 104 | $V_{DD}Q$ | 150 | DQ38 |
| 13 | DQ9 | 59 | BA0 | 105 | DQ12 | 151 | DQ39 |
| 14 | NC | 60 | DQ35 | 106 | DQ13 | 152 | Vss |
| 15 | $V_{DD}Q$ | 61 | DQ40 | 107 | DQM1 | 153 | DQ44 |
| 16 | CK1 | 62 | $V_{DD}Q$ | 108 | $V_{DD}$ | 154 | RAS# |
| 17 | NC | 63 | WE# | 109 | DQ14 | 155 | DQ45 |
| 18 | Vss | 64 | DQ41 | 110 | DQ15 | 156 | $V_{DD}Q$ |
| 19 | DQ10 | 65 | CAS# | 111 | CKE1 | 157 | S0# |
| 20 | DQ11 | 66 | Vss | 112 | $V_{DD}Q$ | 158 | S1# |
| 21 | CKE0 | 67 | NC | 113 | NC(BA2) | 159 | DQM5 |
| 22 | $V_{DD}Q$ | 68 | DQ42 | 114 | DQ21 | 160 | Vss |
| 23 | DQ16 | 69 | DQ43 | 115 | NC(A12) | 161 | DQ46 |
| 24 | DQ17 | 70 | $V_{DD}$ | 116 | Vss | 162 | DQ47 |
| 25 | NC | 71 | NC(S2#) | 117 | DQ21 | 163 | NC(S3#) |
| 26 | Vss | 72 | DQ48 | 118 | A11 | 164 | $V_{DD}Q$ |
| 27 | A9 | 73 | DQ49 | 119 | DQM2 | 165 | DQ52 |
| 28 | DQ18 | 74 | Vss | 120 | $V_{DD}$ | 166 | DQ53 |
| 29 | A7 | 75 | NC | 121 | DQ22 | 167 | NC(FETEN) |
| 30 | $V_{DD}Q$ | 76 | CK2 | 122 | A8 | 168 | $V_{DD}$ |
| 31 | DQ19 | 77 | $V_{DD}Q$ | 123 | DQ23 | 169 | DQM6 |
| 32 | A5 | 78 | NC | 124 | Vss | 170 | DQ54 |
| 33 | DQ24 | 79 | DQ50 | 125 | A6 | 171 | DQ55 |
| 34 | Vss | 80 | DQ51 | 126 | DQ28 | 172 | $V_{DD}Q$ |
| 35 | DQ25 | 81 | Vss | 127 | DQ29 | 173 | NC |
| 36 | NC | 82 | $V_{DDID}$ | 128 | $V_{DD}Q$ | 174 | DQ60 |
| 37 | DQ56 | 83 | DQ56 | 129 | DQM3 | 175 | DQ61 |
| 38 | $V_{DD}$ | 84 | DQ57 | 130 | A3 | 176 | Vss |
| 39 | DQ26 | 85 | $V_{DD}$ | 131 | DQ30 | 177 | DQM7 |
| 40 | DQ27 | 86 | NC | 132 | Vss | 178 | DQ62 |
| 41 | A2 | 87 | DQ58 | 133 | DQ31 | 179 | DQ63 |
| 42 | Vss | 88 | DQ59 | 134 | NC | 180 | $V_{DD}Q$ |
| 43 | A1 | 89 | Vss | 135 | NC | 181 | SA0 |
| 44 | NC | 90 | WP | 136 | $V_{DD}Q$ | 182 | SA1 |
| 45 | NC | 91 | SDA | 137 | CK0 | 183 | SA2 |
| 46 | $V_{DD}$ | 92 | SCL | 138 | NC | 184 | $V_{DDSPD}$ |

PERSONAL COMPUTER MAIN BOARD FOR MOUNTING THEREIN MEMORY MODULE

FIELD OF THE INVENTION

The present invention relates to a personal computer (PC) main board, and more particularly to a personal computer (PC) main board for mounting therein a memory module.

BACKGROUND OF THE INVENTION

Figure 1A:
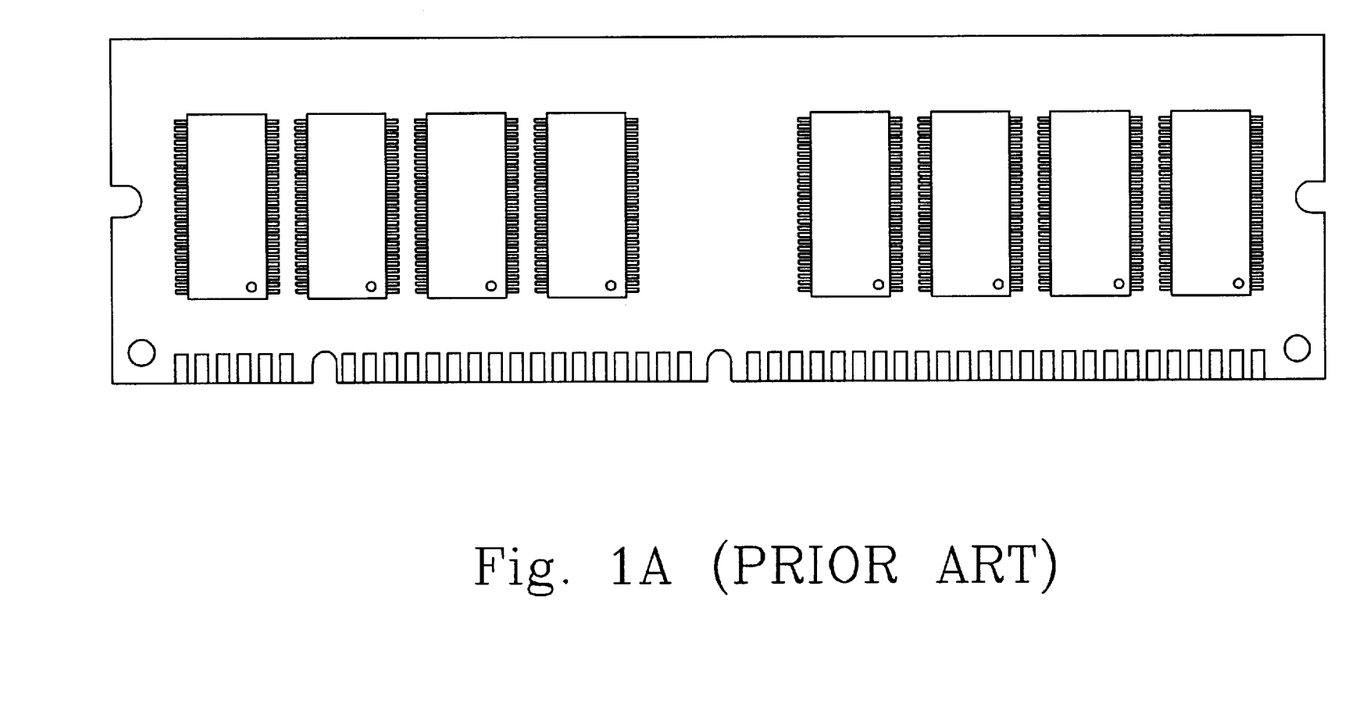
FIG. 1A is a schematic view showing a 168-pin memory module according to the prior art.
Figure 1B:
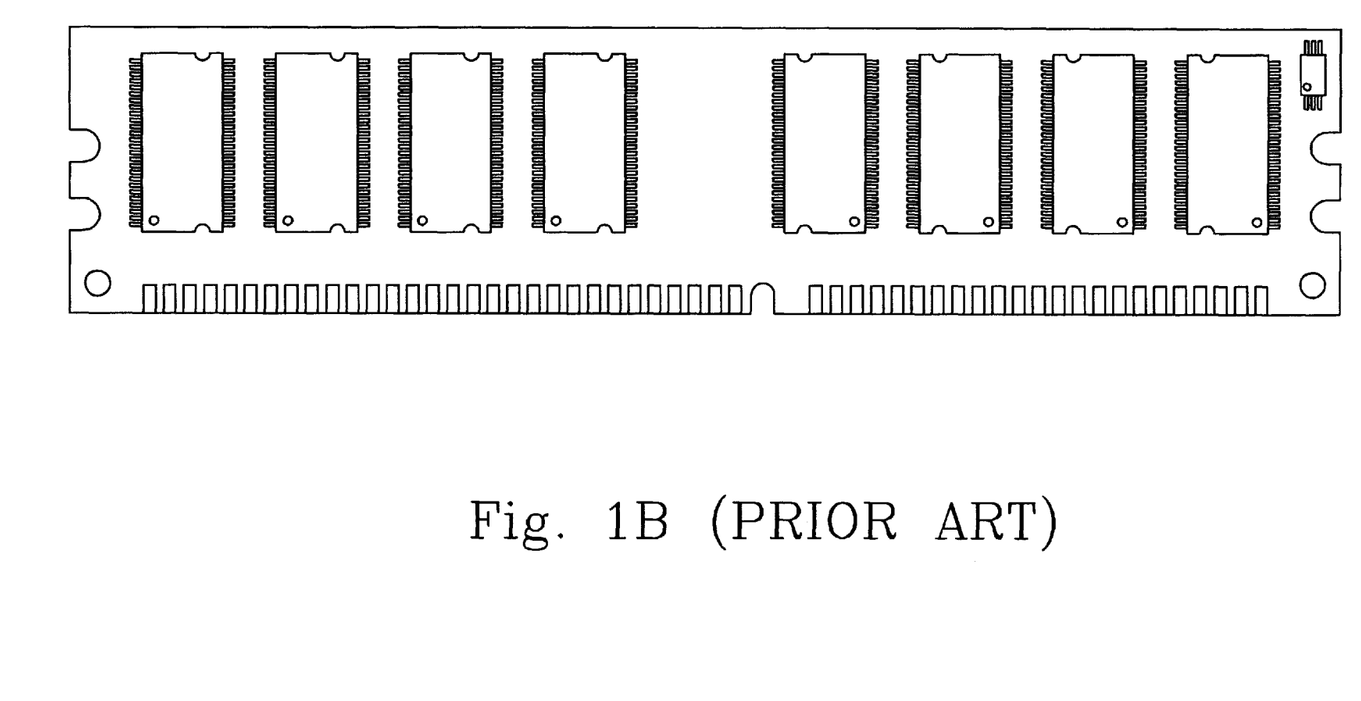
FIG. 1B is a schematic view showing a 184-pin memory module according to the prior art.

Presently, it is an alternation of generations from a SDR mode (i.e. Synchronous Dynamic Random Access Memory, SDRAM) to a DDR mode (i.e. Double Data Rate Synchronous DRAM, DDR SDRAM) with the development generation of Dynamic Random Access Memory (DRAM). Generally, the SDR mode DRAM has 168 pins in the memory module shown in FIG. 1A and the DDR mode DRAM has 184 pins in the memory module shown in FIG. 1B. The differences between the SDR mode DRAM and the DDR mode DRAM are an operation voltage, for example, the operation voltage of the SDR mode is 3 Volt and that of the DDR mode is 2.5 Volt and an electric interface mode for example, an extra power supply DDR-VTT and a serial resistor are added on the DDR mode DRAM. Nowadays, a chipset for supporting different operation modes is mounted in the conventional main board in order to support the above-mentioned memory modules. Further, two types of slots for supporting 168 pins and 184 pins are mounted in the main board for being inserted therein by the users, respectively. However, the operation modes of the SDR mode DRAM and the DDR mode DRAM couldn't be performed at the same time. Therefore, only one of the two types of slots would be performed in practice, and more space of the main board is occupied.

It is therefore tried by the applicant to deal with the above situation encountered in the prior art.

SUMMARY OF THE INVENTION

It is an object of the present invention to provide a personal computer main board having a dual use memory module slot for mounting therein the memory modules of a Synchronous Dynamic Random Access Memory (SDRAM) and a Double Data Rate (DDR) SDRAM.

According to an aspect of the present invention, the personal computer (PC) main, board is used for mounting therein a memory module, and the memory module is capable of mounting therein one selected from a first type of Dynamic Random Access Memory (DRAM) and a second type of Dynamic Random Access Memory (DRAM). The PC main board includes a memory module slot for replacably inserting therein the memory module and providing an operation voltage thereto, a switch device electrically connected to the memory module slot for changing a switching mode to adjust the operation voltage and an electric interface mode of the memory module in response to the type of the memory module, and a chipset electrically connected to the memory module slot and the switch device for switching operation modes between the first type of DRAM and the second type of DRAM in response to the switching mode of the switch device.

The memory module is preferably a 184-pin memory module.

Preferably, the first type of DRAM and the second type of DRAM are a Synchronous DRAM (SDR) chip and a Double Data Rate (DDR) Synchronous DRAM chip, respectively.

Preferably, the memory module slot is a 184-pin memory module slot.

Preferably, the switch device includes a switch electrically connected between the memory module slot and an extra power supply, wherein the switch is in the status of "on" when the memory module mounted on the memory module slot is the first type of DRAM and in the status of "off" when the memory module mounted on the memory module slot is the second type of DRAM, thereby adjusting the electric interface mode of the memory module slot.

Preferably, the switch is a jumper pin-array.

Preferably, the switch is a Dual-Inline Package (DIP) switch.

Preferably, the chipset detects the status of the switch to switch the operation modes between the first type of DRAM and the second type of DRAM, and the memory module slot regulates the operation voltage in response to the status of the switch.

Preferably, the switch device includes a detector electrically connected to the memory module slot for detecting the type of the memory module mounted on the memory module slot to output a control signal, and a controlled switch electrically connected to the detector, the memory module slot and an extra power supply, wherein the controlled switch is in the status of "on" when the memory module detected by the detector is the first type of DRAM and in the status of "off" to provide the extra power supply to the memory module slot to adjust the electric interface mode thereof when the memory module detected by the detector is the second type of DRAM.

Preferably, the chipset switches the operation modes between the first type of DRAM and the second type of DRAM in response to the control signal outputted from the detector, and the memory module slot switches the operation voltage in response to an identification signal defined by a pin of the memory module.

According to another aspect of the present invention, the personal computer (PC) main board is used for mounting therein a memory module, and the memory module is capable of mounting therein one selected from a first type of Dynamic Random Access Memory (DRAM) and a second type of Dynamic Random Access Memory (DRAM). The PC main board includes a memory module slot for replacably inserting therein the memory module and providing an operation voltage thereto, a switch device electrically connected to the memory module slot for changing a switching mode to adjust the operation voltage of the memory module in response to the type of the memory module, and a chipset electrically connected to the memory module slot and the switch device for switching operation modes between the first type of DRAM and the second type of DRAM in response to the switching mode of the switch device.

Preferably, the switch device is a single jumper pin electrically connected to the chipset, wherein the switch device is in the status of "on" when the memory module mounted on the memory module slot is the first type of DRAM and in the status of "off" when the memory module mounted on the memory module slot is the second type of DRAM.

Preferably, the chipset detects the status of the single jumper pin to switch the operation modes between the first type of DRAM and the second type of DRAM and the memory module slot regulates the operation voltage in response to the status of the single jumper pin.

Preferably, the switch device is a detector electrically connected to the memory module slot and the chipset for detecting the type of the memory module mounted on the memory module slot to output a control signal to the chipset and the memory module slot.

Preferably, the chipset detects the control signal outputted from the detector to switch the operation modes between the first type of DRAM and the second type of DRAM and the memory module slot regulates the operation voltage in response to an identification signal defined by a pin of the memory module.

According to another aspect of the present invention, the personal computer (PC) main board is used for mounting therein a memory module, and the memory module is capable of mounting therein one selected from a first type of Dynamic Random Access Memory (DRAM) and a second type of Dynamic Random Access Memory (DRAM). The PC main board includes a memory module slot for replacably inserting therein the memory module and providing an operation voltage thereto, and a chipset electrically connected to the memory module slot for switching operation modes between the first type of DRAM and the second type of DRAM in response to an identification signal defined by a pin of the memory module, thereby adjusting the operation voltage of the memory module.

The present invention may best be understood through the following descriptions with reference to the accompanying drawings, in which:

BRIEF DESCRIPTION OF THE DRAWINGS

FIG. 2 is a table illustrating symbols of a pin for DDR mode DRAM according to a preferred embodiment of the present invention;

FIG. 3 is a table illustrating symbols of a pin for SDR mode DRAM according to a preferred embodiment of the present invention;

DETAILED DESCRIPTION OF THE PREFERRED EMBODIMENTS

FIGS. 2 and 3 are tables illustrating symbols of the pin for the memory module according to a preferred embodiment of the present invention. The 184-pin memory modules (not shown) are used in a SDR mode DRAM (i.e. Synchronous Dynamic Random Access Memory, SDRAM) and a DDR mode DRAM (i.e. Double Date Rate SDRAM, DDR SDRAM) and assembled in the present invention. FIG. 2 is a table illustrating symbols of a pin for the DDR mode DRAM and FIG. 3 is a table illustrating symbols of a pin for the SDR mode DRAM.

Figure 4:
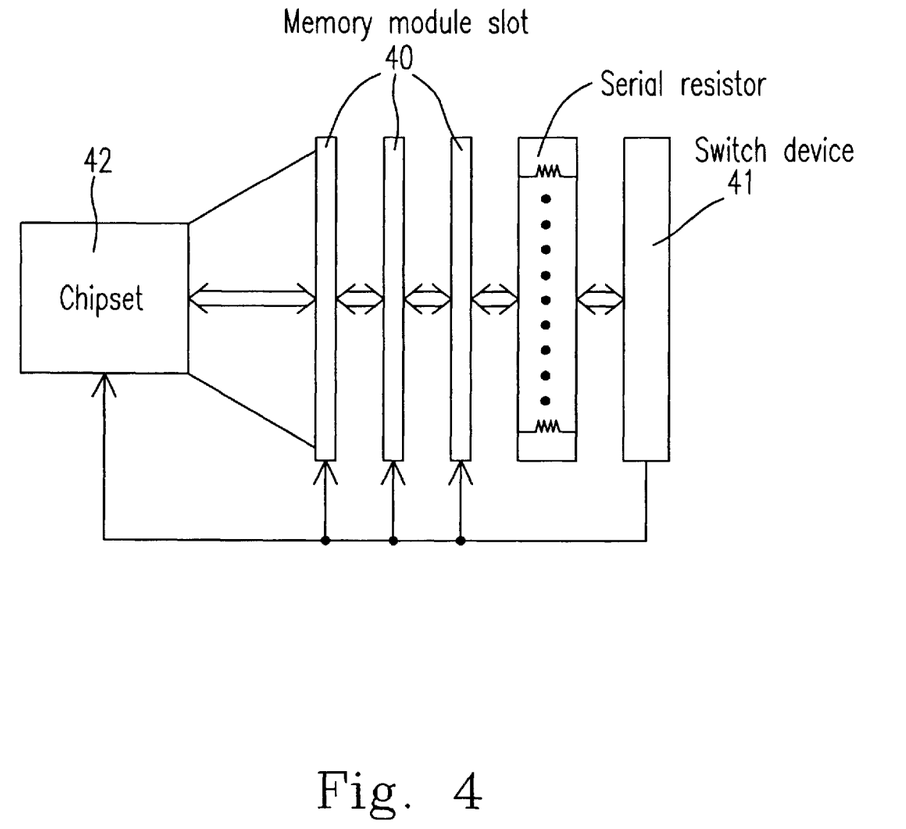
FIG. 4 is a schematic view showing a PC main board for mounting therein a memory module according to a preferred embodiment of the present invention.

FIG. 4 shows a personal computer main board for mounting therein a memory module according to a preferred embodiment of the present invention. A proper operation voltage is provided to the 184-pin memory module by a 184-pin memory module slot 40. A switch device 41 is electrically connected to the memory module slot 40 for changing a switching mode in response to the type of the memory module mounted in the memory module slot 40 and further regulates the operation voltage and the electric interface mode of the memory module slot 40. A chipset 42 electrically connected to the memory module slot 40 and the switch device 41 can switch operation modes between the SDR mode DRAM and the DDR mode DRAM in response to the switching mode of the switch device 40.

Figure 5:
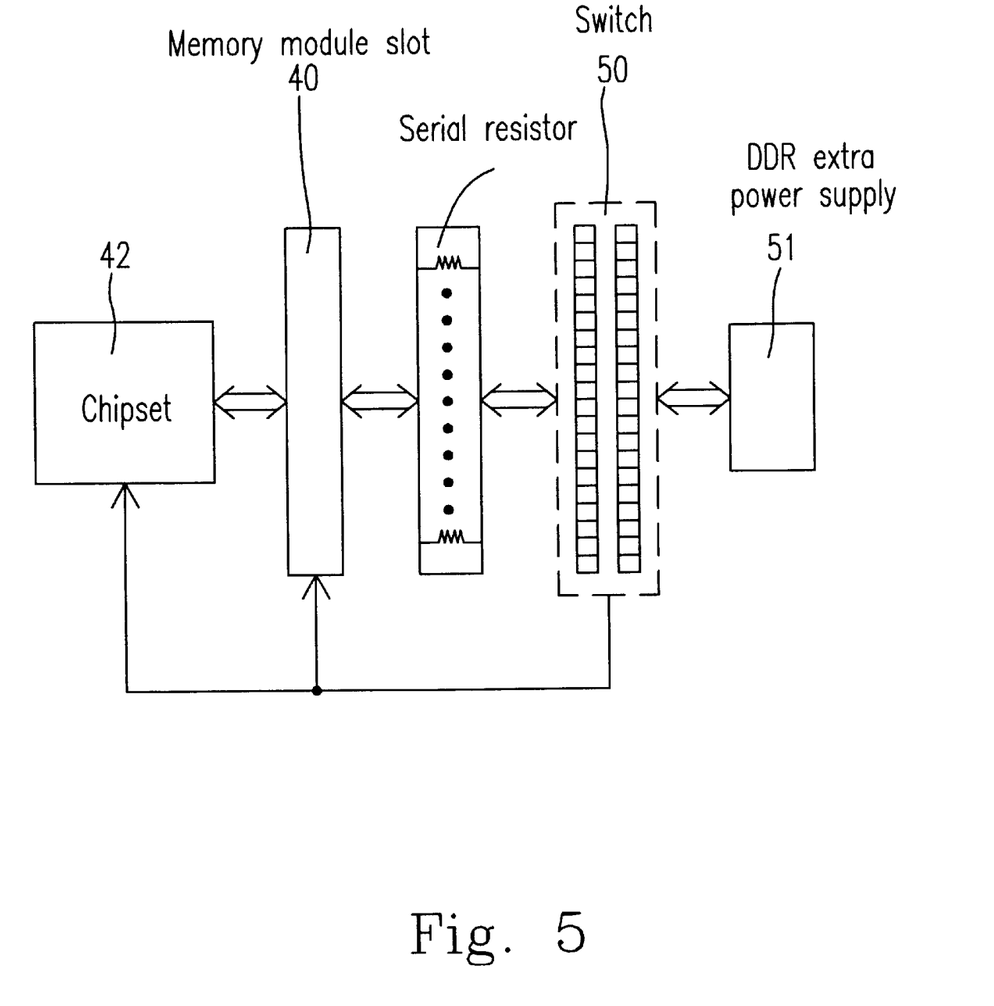
FIG. 5 is a schematic view showing a switch device according to the first preferred embodiment of the present invention.

FIG. 5 shows a switch device according to the first preferred embodiment of the present invention. The switch device is implemented by a switch 50, as shown in FIG. 5. Preferably, the switch 50 is one selected from a Dual-Inline Package (DIP) switch and a jumper pin array. The switch 50 is electrically connected between the memory module slot 40 and a DDR extra power supply 51. Hence, the switch 50 could be in the status of "on" when the memory module mounted in the memory module slot 40 is the SDR mode DRAM. Furthermore, the switch 50 could be in the status of "off" when the memory module mounted in the memory module slot 40 is the DDR mode DRAM, and the DDR extra power supply 51 is provided to change the electric interface mode of the memory module slot 40. When the switch 50 in the status of "on" is detected by the memory module slot 40, the operation voltage of the SDR mode is performed. On the contrast, the operation voltage of the DDR mode DRAM is performed when the switch 50 in the status of "off" is detected by the memory module slot 40. Moreover, the operation mode of the SDR mode DRAM is performed when the switch 50 in the status of "on" is detected by the chipset 42. When the switch 50 in the status of "off" is detected by the chipset 42, the operation mode of the DDR mode DRAM is performed.

Figure 6:
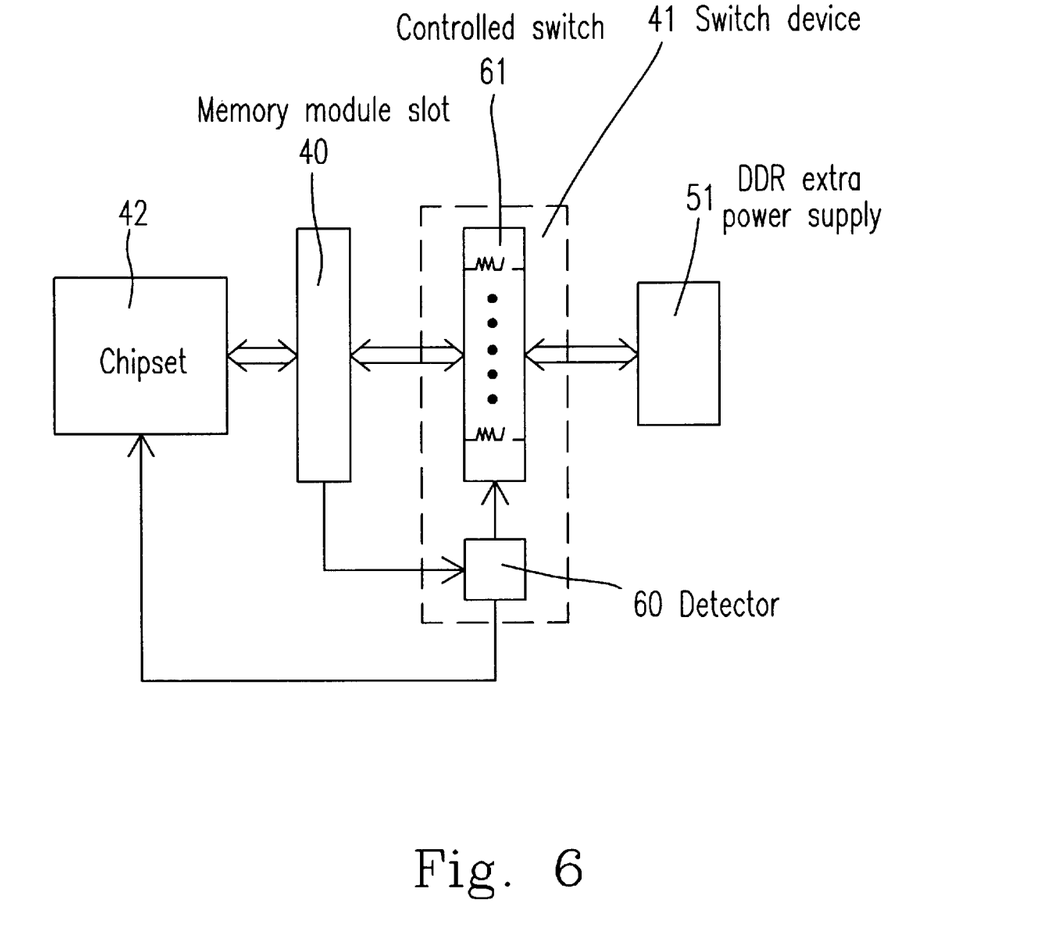
FIG. 6 is a schematic view showing a switch device according to the second preferred embodiment of the present invention.

The above-mentioned switch device is low cost according to the first embodiment of the present invention. It is not convenient for users to switch by hands in operation. Therefore, the switch device in the second embodiment of the present invention is implemented by a detector 60 and a controlled switch 61 as shown in FIG. 6. The detector 60 electrically connected to the memory module slot 40 outputs a control signal in response to the type of the memory module mounted in the memory module slot 40. The controlled switch 61 electrically connected to the detector 60, the memory module slot 40 and the DDR extra power supply 51 is controlled by the control signal outputted from the detector 60. The controlled switch 61 is in the status of "off" for providing the DDR extra power supply 50 to the memory module slot 40 and further changing the electric interface mode of the memory module slot 40 when the memory module is determined to the DDR mode DRAM by the detector 60. The memory module slot 40 performs to switch between the operation voltages of the SDR mode DRAM and the DDR mode DRAM in response to the controlled signal outputted from the detector 60. Moreover, the operation modes of the SDR mode and the DDR mode are switched by the chipset 42 in response to the controlled signal outputted from the detector 60.

An identification signal could be defined in an NC pin of the memory module in a manufacturing process of the memory module, for example, the DDR mode DRAM is a high electric potential and the SDR mode DRAM is a low electric potential, so that the 184-pin DDR mode DRAM and the 184-pin SDR mode DRAM can be detected by the detector 60. Thus, the automatic switch function can be achieved according the present invention.

In practice, the operation condition are still kept normal even though the switch 50 in FIG. 4 and the controlled switch 61 in FIG. 5 are in the status of "off", i.e. the memory module mounted in the memory module slot 40 is the SDR mode DRAM and the memory module slot 40 is electrically conducted by the DDR extra power supply 51. Therefore, only the operation mode of the chipset 42 and the operation voltage provided by the memory module slot 40 are needed to be switched. The operation voltage of the SDR mode is 3 Volt and that of the DDR mode is 2.5 Volt.

Figure 7A:
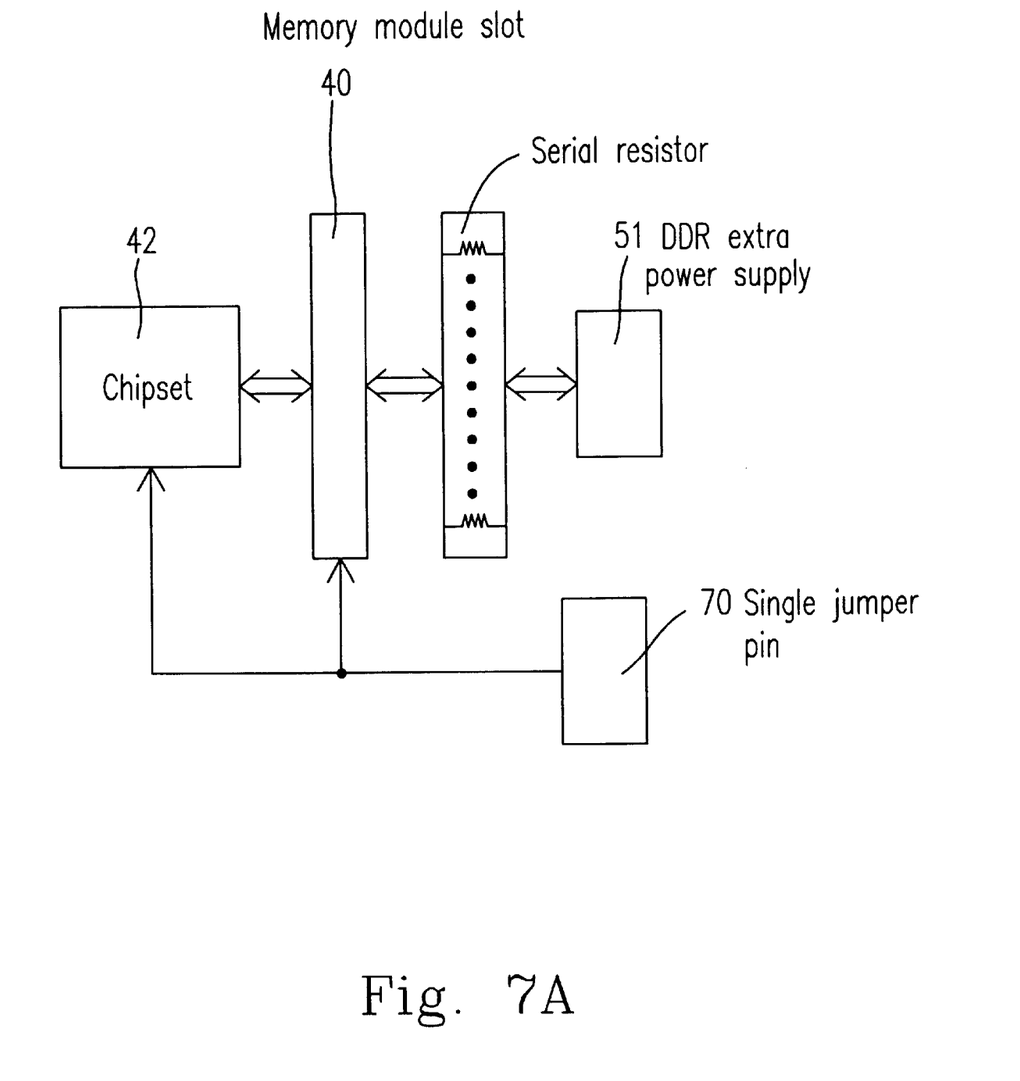
FIGS. 7A and 7B are schematic views showing a switch device according to the third and fourth preferred embodiments of the present invention.

FIG. 7A shows a switch device according to the third preferred embodiment of the present invention. The switch device is implemented by a single jumper pin 70. The single jumper pin 70 is electrically connected to the chipset 42 and the memory module slot 40. The single jumper pin 70 is in the status of "on" when the memory module mounted in the memory module slot 40 is the SDR mode DRAM. When the memory module mounted in the memory module slot 40 is the DDR mode DRAM, the single jumper pin 70 is in the status of "off" and detected by the chipset 42 and the memory module slot 40 for switching to the operation mode of the DDR mode and the operation voltage of the DDR mode DRAM.

Figure 7B:
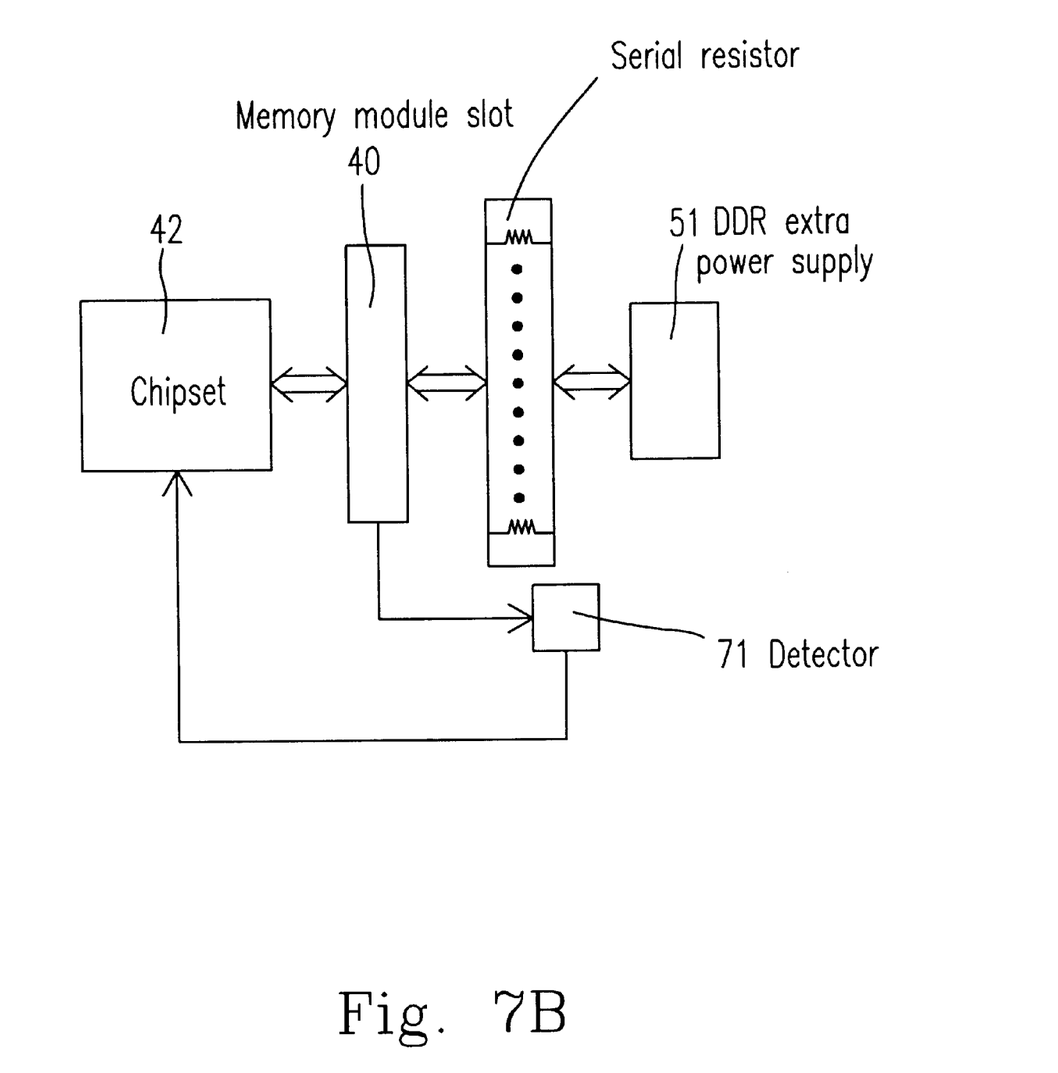

FIG. 7B shows a switch device according to the fourth preferred embodiment of the present invention. The switch device is implemented by a detector 71. The detector 71 is electrically connected to the memory module slot 40. A control signal is outputted from the detector 71 in response to the type mode of the memory module mounted in the memory module slot 40. Similarly, an identification signal could be defined in an NC pin of the memory module in a manufacturing process of the memory module, for example the DDR mode DRAM is high electric potential and the SDR mode DRAM is low electric potential the in order that the 184-pin DDR mode DRAM and the 184-pin SDR mode DRAM could be detected by the detector 71 according to the present invention. Therefore, the operation modes and the operation voltages of the SDR mode and the DDR mode would be switched by the chipset 42 and the memory module slot 40 in response to the controlled signal outputted form the detector 71.

Furthermore, the above-mentioned detectors 60 and 71 can also be integrated into the chipset. Therefore, the memory module mounted in the memory module slot 40 could be detected by the chipset 42. Similarly, an identification signal could be defined in an NC pin of the memory module in the memory module manufacturing process, for example, the DDR mode DRAM is high electric potential and the SDR mode DRAM is low electric potential, thereby the identification function could be achieved. Consequently, the operation modes and the operation voltages of the SDR mode and the DDR mode would be switched by the chipset 42 and the memory module slot 40 in response to the identification signal defined in the NC pin of the memory module.

Two different specifications of memory modules could be supported by using the same pins and memory module slots in the personal computer main board according to the present invention. It is understood that the utility space in the main board could be enhanced and the manufacturing cost will be decreased. Moreover, the stock of the main board during the generation development of DRAM could be decreased.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What I claim is:

1. A personal computer (PC) main board for mounting therein a memory module, said memory module capable of mounting therein one selected from a first type of Dynamic Random Access Memory (DRAM) and a second type of Dynamic Random Access Memory (DRAM), comprising:
    a memory module slot for replaceably inserting therein said memory module and providing an operation voltage thereto;
    a switch device electrically connected to said memory module slot for changing a switching mode to adjust said operation voltage and an electric interface mode of said memory module in response to the type of said memory module; and
    a chipset electrically connected to said memory module slot and said switch device for switching operation modes between said first type DRAM of and said second type of DRAM in response to said switching mode of said switch device.

2. The PC main board according to claim 1, wherein said memory module is a 184-pin memory module.

3. The PC main board according to claim 1, wherein said first type of DRAM and said second type of DRAM are a Synchronous DRAM (SDR) chip and a Double Data Rate (DDR) Synchronous DRAM chip, respectively.

4. The PC main board according to claim 1, wherein said memory module slot is a 184-pin memory module slot.

5. The PC main board according to claim 1, wherein said switch device comprises a switch electrically connected between said memory module slot and an extra power supply, wherein said switch is in the status of "on" when said memory module mounted on said memory module slot is said first type of DRAM and in the status of "off" when said memory module mounted on said memory module slot is said second type of DRAM, thereby adjusting said electric interface mode of said memory module slot.

6. The PC main board according to claim 5, wherein said switch is a jumper pin-array.

7. The PC main board according to claim 5, wherein said switch is a Dual-Inline Package (DIP) switch.

8. The PC main board according to claim 5, wherein said chipset detects said status of said switch to switch said operation modes between said first type of DRAM and said second type of DRAM, and said memory module slot regulates said operation voltage in response to said status of said switch.

9. The PC main board according to claim 1, wherein said switch device comprises:
    a detector electrically connected to said memory module slot for detecting the type of said memory module mounted on said memory module slot to output a control signal; and
    a controlled switch electrically connected to said detector, said memory module slot and an extra power supply, wherein said controlled switch is in the status of "on" when said memory module detected by said detector is said first type of DRAM and in the status of "off" to provide said extra power supply to said memory module slot to adjust said electric interface mode thereof when said memory module detected by said detector is said second type of DRAM.

10. The PC main board according to claim 9, wherein said chipset switches said operation modes between said first type of DRAM and said second type of DRAM in response to said control signal outputted from said detector, and said memory module slot switches and operation voltage in response to an identification signal defined by a pin of said memory module.

11. A personal computer (PC) main board for mounting therein a memory module, said memory module capable of mounting therein one selected from a first type of Dynamic Random Access Memory (DRAM) and a second type of Dynamic Random Access Memory (DRAM), comprising:

a memory module slot for replaceably inserting therein said memory module and providing an operation voltage thereto; and a chipset electrically connected to said memory module slot for switching operation modes between said first type of DRAM and said second type of DRAM in response to an identification signal defined by a pin of said memory module, thereby adjusting said operation voltage of said memory module.

* * * * *